(12) United States Patent
Yurko et al.

(10) Patent No.: US 11,253,120 B2
(45) Date of Patent: Feb. 22, 2022

(54) IN-VEHICLE VACUUM CLEANER

(71) Applicant: SHOP VAC CORPORATION, Williamsport, PA (US)

(72) Inventors: Michael Z. Yurko, Endicott, NY (US); Neil N. Norell, Candor, NY (US)

(73) Assignee: SHOP VAC CORPORATION, Williamsport, PA (US)

( * ) Notice: Subject to any disclaimer, the term of this patent is extended or adjusted under 35 U.S.C. 154(b) by 542 days.

(21) Appl. No.: 16/305,810

(22) PCT Filed: Jul. 18, 2017

(86) PCT No.: PCT/US2017/042602
§ 371 (c)(1),
(2) Date: Nov. 29, 2018

(87) PCT Pub. No.: WO2018/017572
PCT Pub. Date: Jan. 25, 2018

(65) Prior Publication Data
US 2020/0323406 A1    Oct. 15, 2020

Related U.S. Application Data

(60) Provisional application No. 62/474,293, filed on Mar. 21, 2017, provisional application No. 62/379,129, (Continued)

(51) Int. Cl.
*A47L 5/38* (2006.01)
*A47L 9/14* (2006.01)
(Continued)

(52) U.S. Cl.
CPC ............... *A47L 5/38* (2013.01); *A47L 9/122* (2013.01); *A47L 9/1409* (2013.01); *A47L 9/242* (2013.01);
(Continued)

(58) Field of Classification Search
CPC .......... A47L 5/38; A47L 9/122; A47L 9/1409; A47L 9/242; A47L 9/248; A47L 9/2868; B60S 1/64
See application file for complete search history.

(56) References Cited

U.S. PATENT DOCUMENTS 5,189,753 A    3/1993   Sousa et al.
5,647,091 A *  7/1997   deBlois ................ A01K 13/001
                                                          15/323
(Continued)

FOREIGN PATENT DOCUMENTS

EP    0657587 A1    6/1995
EP    0674869 A1   10/1995
(Continued)

OTHER PUBLICATIONS

International Search Report and Written Opinion, corresponding International Application No. PCT/US2017/042592, dated Mar. 19, 2018.

(Continued)

*Primary Examiner* — Andrew A Horton
(74) *Attorney, Agent, or Firm* — Marshall, Gerstein & Borun LLP

(57) ABSTRACT

Vacuum cleaners to be mounted in a vehicle are disclosed. Some vacuum cleaners include a collector module configured to collect debris and a motor/impeller unit connected to the collector module. The collector module includes an air inlet and an air exhaust opening, and the motor/impeller unit is configured to draw air through the collector module from the air inlet to the exhaust opening. A hose storage module is connected to the air inlet, and a vacuum hose is stored inside the hose storage module.

7 Claims, 11 Drawing Sheets

Related U.S. Application Data filed on Aug. 24, 2016, provisional application No. 62/364,183, filed on Jul. 19, 2016.

(51) Int. Cl.
*A47L 9/24* (2006.01)
*B60S 1/64* (2006.01)
*A47L 9/12* (2006.01)
*A47L 9/28* (2006.01)

(52) U.S. Cl.
CPC ............. *A47L 9/248* (2013.01); *A47L 9/2868* (2013.01); *B60S 1/64* (2013.01)

(56) References Cited

U.S. PATENT DOCUMENTS

| | | | |
|---|---|---|---|
| 5,829,091 | A | 11/1998 | Ingram et al. |
| 6,128,804 | A | 10/2000 | Lee et al. |
| 6,148,472 | A | 11/2000 | Arena |
| 6,490,751 | B2 | 12/2002 | Ganzenmuller |
| 6,553,610 | B1 | 4/2003 | Shideler |
| 6,813,805 | B2 | 11/2004 | Ganzenmuller |
| 7,152,272 | B2 | 12/2006 | Rukavina et al. |
| 7,266,859 | B2 | 9/2007 | Slone |
| 7,480,957 | B2 | 1/2009 | Ganzenmuller, V |
| 8,347,452 | B2 | 1/2013 | Maehata et al. |
| 8,615,845 | B2 | 12/2013 | Norell et al. |
| 9,499,134 | B2 | 11/2016 | Camiller |
| 9,751,504 | B2 | 9/2017 | Schultz et al. |
| 10,099,659 | B1 | 10/2018 | Williams et al. |
| 2003/0167590 | A1 | 9/2003 | Oh |
| 2003/0217432 | A1 | 11/2003 | Oh et al. |
| 2004/0107528 | A1 | 6/2004 | LeClear et al. |
| 2004/0134013 | A1 | 7/2004 | Slone |
| 2005/0011035 | A1* | 1/2005 | Rukavina ............. A47L 7/0076 15/313 |
| 2005/0066468 | A1 | 3/2005 | Ganzenmuller |
| 2005/0273969 | A1 | 12/2005 | Watson et al. |
| 2006/0080801 | A1 | 4/2006 | Nameth |
| 2006/0085940 | A1 | 4/2006 | Chernoff |
| 2010/0005612 | A1 | 1/2010 | Moore |
| 2010/0083457 | A1 | 4/2010 | Norell et al. |
| 2010/0242206 | A1 | 9/2010 | Maehata et al. |
| 2012/0210536 | A1 | 8/2012 | Jan et al. |
| 2014/0130293 | A1 | 5/2014 | Lee et al. |
| 2015/0307066 | A1 | 10/2015 | Camiller |
| 2016/0068141 | A1 | 3/2016 | Schultz et al. |
| 2016/0368461 | A1 | 12/2016 | Logli, Jr. et al. |

FOREIGN PATENT DOCUMENTS

| | | |
|---|---|---|
| WO | WO-91/18773 A1 | 12/1991 |
| WO | WO-2006/088434 A1 | 8/2006 |
| WO | WO-2017/031030 A1 | 2/2017 |

OTHER PUBLICATIONS

International Search Report and Written Opinion, corresponding International Application No. PCT/US2017/042602, dated Feb. 26, 2018.
International Search Report and Written Opinion, corresponding International Application No. PCT/US2017/042616, dated Mar. 3, 2018.
International Preliminary Report on Patentability and Written Opinion, corresponding to International Application No. PCT/US2017/042592, dated Jan. 22, 2019.
International Preliminary Report on Patentability and Written Opinion, corresponding to International Application No. PCT/US2017/042602, dated Jan. 22, 2019.
International Preliminary Report on Patentability and Written Opinion, corresponding to International Application No. PCT/US2017/042616, dated Jan. 22, 2019.
European Search Report and Opinion for European Application No. 18162948.6, dated Jul. 26, 2018.

* cited by examiner

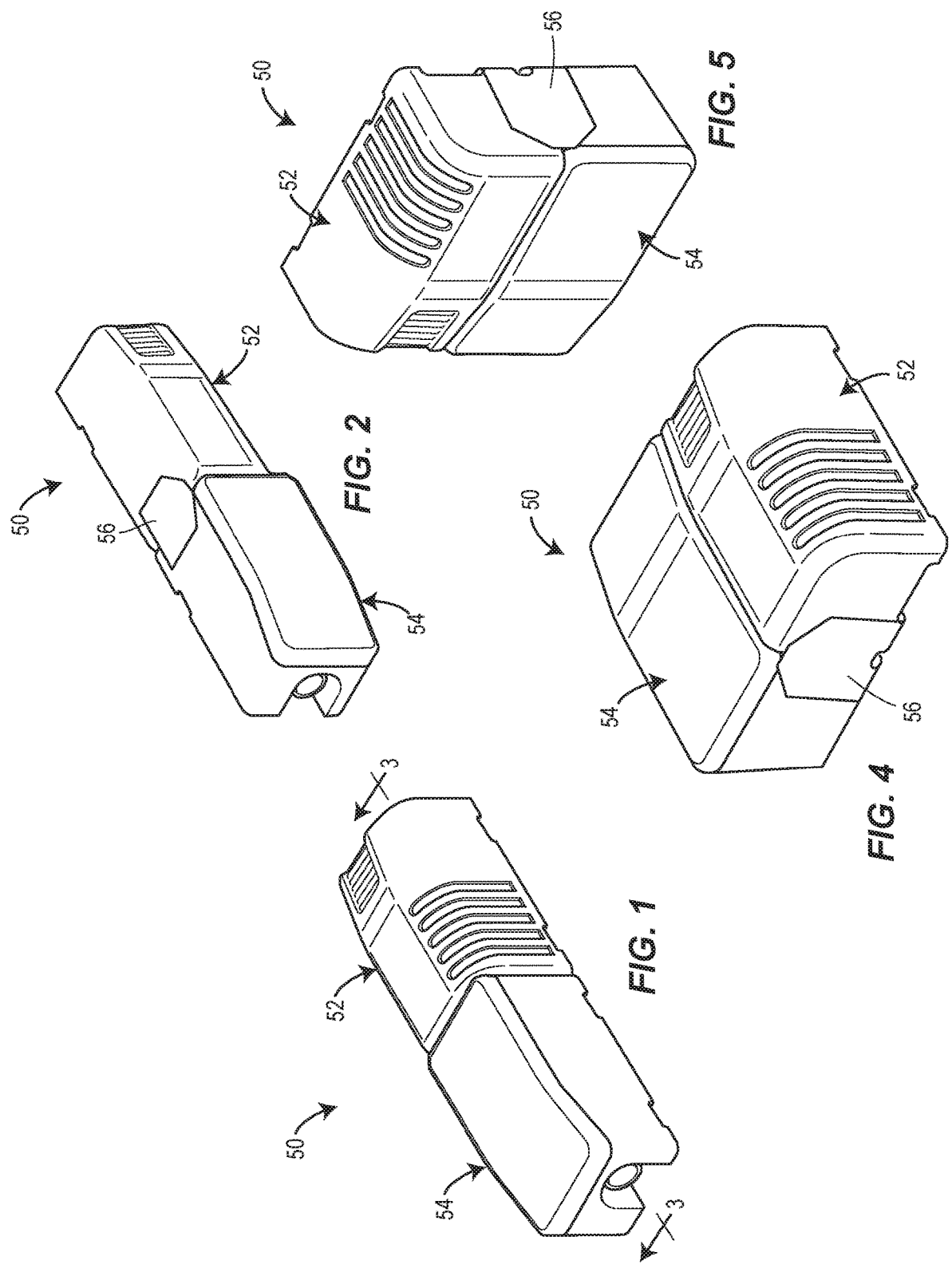

IN-VEHICLE VACUUM CLEANER

FIELD OF THE INVENTION

The present invention relates generally to a vacuum cleaner that can be configured in a variety of ways, for instance to be mounted in a number of locations in a vehicle.

BACKGROUND

In order to clean a vehicle, such as a car or truck, a vacuum cleaner is often used to vacuum out dirt and debris. However, it can be awkward and/or inconvenient to use a typical in-home vacuum cleaner to clean out the interior of a vehicle. To address this inconvenience, attempts have been made to permanently install on-board vehicle vacuum cleaners inside the vehicle. However, the known on-board vehicle vacuum cleaners typically have a complex and dedicated installation arrangement, which limits the usage across different vehicles and/or in different arrangements within a vehicle.

SUMMARY

It is an object of the present disclosure to provide one or more vacuum cleaners to be mounted in a vehicle that improve upon previously known on-board vehicle vacuum cleaners.

According to some aspects of the present disclosure, a vacuum cleaner configured to be installed in a vehicle includes a collector module configured to collect debris, a motor/impeller unit, and a vacuum hose. The collector module may include a collector housing and a debris canister removably disposed in the collector housing, and wherein the collector housing includes an air inlet and an air exhaust opening. The motor/impeller unit may be connected to the collector housing at the air exhaust opening. The motor/impeller unit may be configured to draw air through the collector module from the air inlet to the air exhaust opening. A hose storage module may be connected to the air inlet, and a vacuum hose may be stored inside the hose storage module.

According to another aspect of the present disclosure, a vacuum cleaner comprises a collector module configured to collect debris, wherein the collector module includes a collector housing and a debris canister is removably disposed in the collector housing. The collector housing includes an air inlet that connects to an air inlet in the canister and an air exhaust opening that connects to an air exhaust opening in the canister. The vacuum cleaner further comprises a motor/impeller unit connected to the collector housing at the air exhaust opening, and the motor/impeller unit is configured to draw air through the collector module from the air inlet to the air exhaust opening. A vacuum hose is attached to the air inlet. The collector module is located beneath a cup holder in the vehicle and the canister is removed from the collector module by removing the cup holder and lifting out the canister.

According to another aspect of the present disclosure, a vacuum cleaner comprises a collector module configured to collect debris, wherein the collector module includes a collector housing and a debris canister has a lid removably disposed in the collector housing. The collector housing includes an air inlet that connects to an air inlet in the canister and an air exhaust opening that connects to an air exhaust opening in the canister. The vacuum cleaner also comprises a motor/impeller unit connected to the collector housing at the air exhaust opening. The motor/impeller unit may be configured to draw air through the collector module from the air inlet to the air exhaust opening. The vacuum cleaner further comprises a vacuum hose attached to the air inlet.

In further accordance with any one or more of the foregoing aspects and exemplary arrangements, a vacuum cleaner according to the teachings of the present disclosure may include any one or more of the following optional features and/or arrangements in any functionally useful combination.

The collector module, the motor/impeller unit, and the hose compartment may be arranged in an in-line configuration.

The vacuum module may include a motor/impeller unit disposed within a motor housing. The motor/impeller unit may include an electric motor, an impeller assembly, and a controller. The motor/impeller unit may further include power electronics and/or a heat sink. In some arrangements, the power electronics and/or the heat sink is disposed at opposing perpendicular angles relative to a printed circuit board (PCB) of the controller. The impeller assembly and the motor may be axially aligned in-line with each other. Any heat sink may also be axially aligned with the impeller assembly and the motor. The controller and the power electronics and/or the heat sink may be arranged in a saddle-shaped arrangement over and/or around the motor. A motor/impeller unit according to one or more of these features can provide a relatively small package outline, which may be useful for increasing the possible installation arrangements within a vehicle. The vacuum module may include an intake receiver configured to receive at least one end of the interconnecting duct.

The collector module may include a collector housing and a debris canister removably disposed in the collector housing. The debris canister may be configured to be slidably removed from and/or reinserted into the collector housing. The collector module may include a mounting bracket. The motor/impeller unit may be attached to the collector module with the mounting bracket. The collector housing may include a hose connector coupled to an air inlet. The hose connector may be configured to be coupled to a vacuum hose. A vacuum hose may be coupled to the hose connector. The vacuum hose may be flexible.

In other aspects, the air inlet may comprise a tube that forms a hose connector outwardly extending from the collector housing. In addition, the air exhaust opening may comprise a tube extending to a surface of an end of the collector housing opposite the air inlet. Further, one or more of the tube that comprises the air inlet and the tube that comprises the air exhaust opening may be angled on an inner side of the collector housing. Also, the debris canister may include tapered shoulders that rest on ends of the tubes of the air inlet and the air exhaust opening. Further, an air intake opening of the collector housing may extend through one shoulder of the debris canister and the air exhaust opening may extend through an opposite shoulder of the debris canister.

In still other aspects, the canister may be removed from the collector module while the lid remains on the canister.

A hose storage module may be attached to the collector module. The vacuum hose may be stored inside the hose storage module. A lid may be configured to be opened to allow access to the vacuum hose stored inside the hose compartment, and configured to be closed to cover the vacuum hose stored inside hose compartment.

According to some aspects of the present disclosure, a vehicle may have installed therein any one or more of the vacuum cleaners and any one or more of the components disclosed herein. The vehicle may be a car, a truck, an SUV, an airplane, a boat, a tractor, and so on. The vacuum cleaner may be installed completely or partially within the passenger compartment of the vehicle. Preferably the vacuum cleaner is installed so that a vacuum hose of the vacuum cleaner is disposed on the interior of the passenger compartment. The vacuum cleaner may be installed in a center console in the passenger compartment. The vacuum cleaner may be installed in other locations in the passenger compartment. One or both of the motor housing and the collector housing may be fixedly attached to the vehicle. The debris canister may be configured to be slidably removed from and/or slidably reinserted into the collector housing without disconnecting the collector housing or the motor housing from the vehicle.

Additional optional aspects, arrangements, forms, and/or advantages of the vacuum cleaners disclosed herein will be apparent upon consideration of the following detailed description and the appended drawings, each different functionally operable and technically effective combination of which is expressly included as a part of the present disclosure.

BRIEF DESCRIPTION OF THE DRAWINGS

FIG. 1 is an isometric view of a vacuum cleaner to be mounted inside a vehicle according to the present disclosure in a first assembly arrangement and installation orientation;

FIG. 2 is another isometric view of the vacuum cleaner of FIG. 1 in another installation orientation;

FIG. 4 is an isometric view of the vacuum cleaner of FIG. 1 in a second assembly arrangement and installation orientation;

FIG. 5 is another isometric view of the vacuum cleaner of FIG. 1 in the second assembly arrangement in another installation orientation;

DETAILED DESCRIPTION

Turning now to the drawings, FIGS. 1-9 illustrate an in-vehicle vacuum cleaner 50 according to some aspects of the disclosure. The vacuum cleaner 50 is configured to be installed and operated within a vehicle, such as a car or truck or other type of vehicle. Preferably, the vacuum cleaner 50 is configured to be installed within a passenger compartment of the vehicle to provide easy access and use of the vacuum cleaner for cleaning the interior of the passenger compartment. The vacuum cleaner can be installed in other parts of the vehicle, such as a hatch or the trunk, and may be used in environments other than vehicles.

Figure 3:
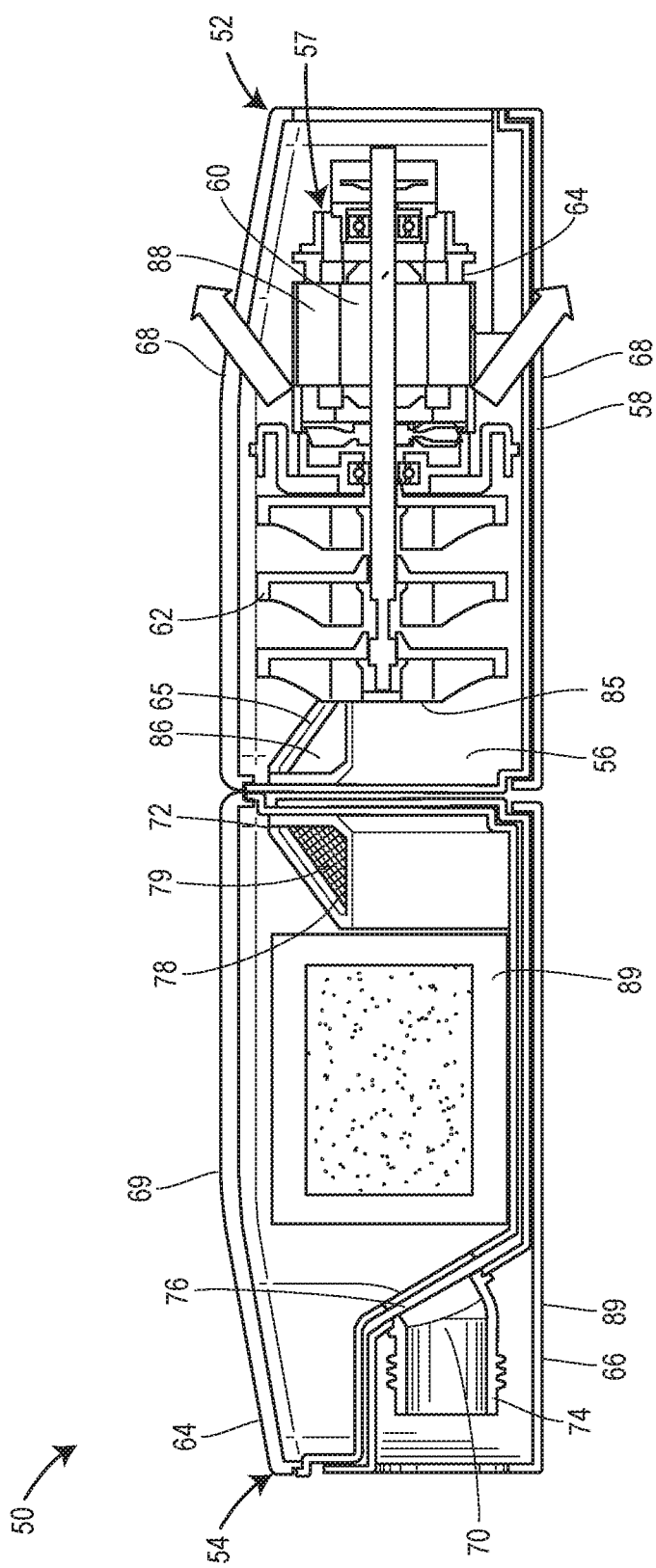
FIG. 3 is a longitudinal cross-sectional view along the lines 3-3 of FIG. 1.
Figure 6:
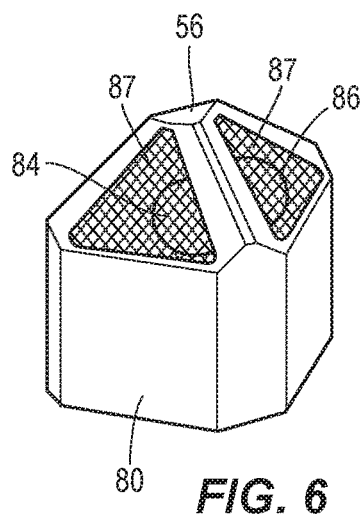
FIG. 6 is an isometric view of an interconnecting duct of the vacuum cleaner of FIG. 1.
Figure 7:
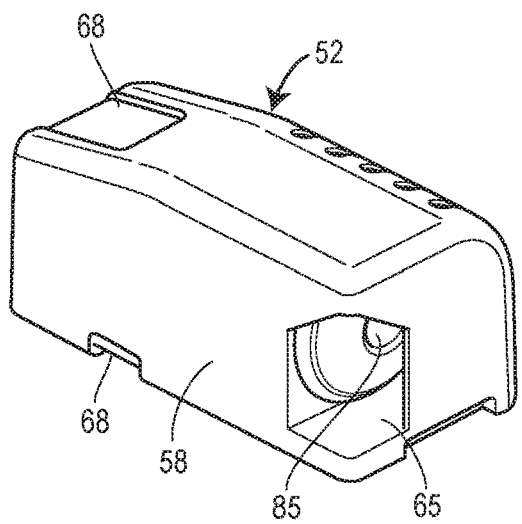
FIG. 7 is an isometric view of a vacuum module of the vacuum cleaner of FIG. 1.
Figure 8:
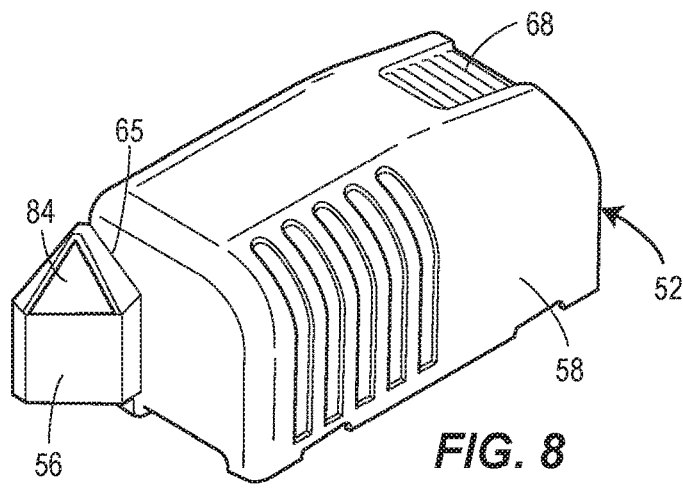
FIG. 8 is an isometric view of the vacuum module and the interconnecting duct assembled in accordance with the first assembly arrangement of FIGS. 1 and 2.
Figure 9:
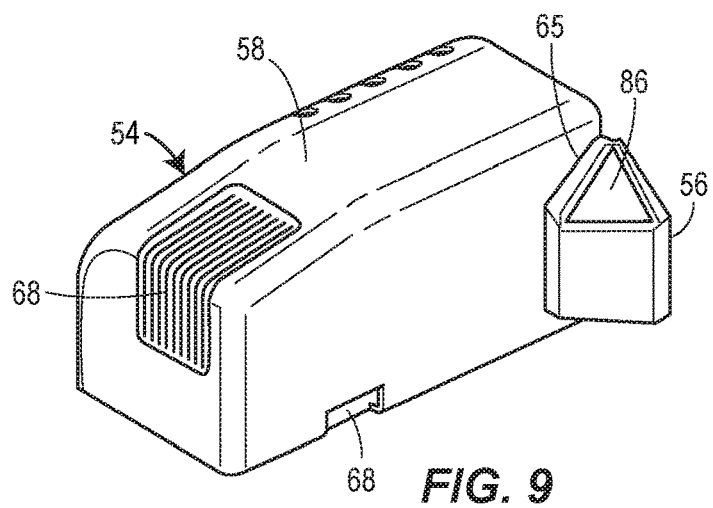
FIG. 9 is an isometric view of the vacuum assembly and the interconnecting duct assembled in accordance with the second assembly arrangement of FIGS. 4 and 5.

The vacuum cleaner 50 has a modular configuration, including a vacuum module 52 and a collector module 54 that can be connected to each other as an integrated unit in any of a plurality of different assembly arrangements (which may be pre-defined) with an interconnecting duct 56. The interconnecting duct 56 may be flexible, but can also have a fixed shape that allows the collector module 54 to be operatively connected to the vacuum module 52 in only a limited number of predefined assembly arrangements. For example, FIGS. 1-3 illustrate the vacuum cleaner 50 with the collector module 54 operatively connected to the vacuum module 52 in an in-line configuration, and FIGS. 4 and 5 illustrate the vacuum cleaner 50 with the collector module 54 operatively connected to the vacuum module 52 in a side-by-side configuration. Furthermore, FIG. 1 illustrates the vacuum cleaner in the in-line configuration disposed in an upright installation orientation, whereas FIG. 2 illustrates the vacuum cleaner in the in-line configuration disposed in a sideways installation orientation. Similarly, FIG. 4 illustrates the vacuum cleaner in the side-by-side configuration disposed in an upright or vertical installation orientation, whereas FIG. 5 illustrates the vacuum cleaner in the side-by-side or horizontal configuration in a sideways installation orientation.

Because of its modular design, the vacuum cleaner 50 can be easily assembled and/or oriented in many different shapes and orientations, which provides the advantage of being able to easily configure the vacuum cleaner 50 to fit different shapes and/or configurations of spaces within a vehicle while maintaining the vacuum cleaner 50 as an integrated unit. For example, the vacuum cleaner 50 may be configured and oriented to fit in a space between seats, such as within a center console, or the vacuum cleaner 50 may be configured and oriented to fit on the side or underneath a seat, in a space along the side wall of a cargo bay or passenger compartment of a sport utility vehicle (SUV), in the trunk, and so on. However, because the interconnecting duct 56 can have a substantially rigid shape and couples the collector module 54 to the vacuum module 52 in orientations as an integral unit, the vacuum cleaner 50 can be easily installed and/or removed and/or otherwise moved around as a single unit, which may provide easier handling of the vacuum cleaner 50 as compared to a vacuum cleaner that is not connected together as an integrated unit.

FIG. 3 illustrates in greater detail various components of the vacuum cleaner 50 in the assembled configuration corresponding with FIGS. 1 and 2. However, the same components are also provided in the assembled configuration of FIGS. 4 and 5.

The vacuum module 52 includes a motor/impeller unit 57 bundled together as a single component within a motor housing 58. The motor housing 58 in this arrangement is in the form of an outer shell having a generally elongate rectangular form. However, the motor housing 58 may take many different forms, shapes and sizes depending upon the particular space needs and/or arrangements desired for installation in a particular vehicle. The motor/impeller unit 57 includes a motor 60 that drives an impeller assembly 62 and a controller 64 that controls the motor 60. The motor 60 can be of any design suitable for vacuum cleaners, including standard motors with brushes or brushless motors, including switched reluctance motors. The impeller assembly 62 may take any form suitable for moving air in a manner that will create a vacuum. In this arrangement, the impeller assembly 62 includes three in-line impellers. However, other forms of the impeller assembly 62 may also be used. The motor 60 is operatively coupled to the impeller assembly 62 in order to drive the impellers to create a vacuum. The controller 64 includes suitable electronics, such as a PCB board and/or other appropriate electronic control circuits configured to control the motor 60. As most easily seen in FIGS. 3 and 7, the motor housing 58 includes an intake opening 65 that forms a duct receiver and an air inlet for air that is drawn into the impeller assembly 62 and one or more air outlet openings 68 for exhausting air exhausted from the impeller assembly 62.

The collector module 54 includes a debris canister 64 disposed within a collector housing 66. The debris canister 64 includes a lid 69 that can be selectively opened to provide access to the interior of the debris canister 64. The debris canister 64 is removably received within the collector housing 66 such that the debris canister 64 can be slidably removed from and returned into the collector housing 66. The collector housing 66 also includes an air inlet 70 at one end of the housing and an air exhaust opening 72 is the opposite end of the collector housing 66. A hose connector 74 extends outwardly from the air inlet 70 for coupling with a vacuum hose (not shown). The air exhaust opening 72 also informs a duct receiver and an air outlet. The debris canister 64 also includes an air intake opening 76 and an air outlet opening 78. The air intake opening 76 and the air outlet opening 78 of the debris canister 64 align with the air inlet 70 and the air exhaust opening 72 of the collector housing 66, respectively, when the debris canister 64 is operatively disposed within the collector housing 66, as shown in FIG. 3.

As best seen in FIGS. 3 and 6-9, the interconnecting duct 56 has a substantially rigid body 80 that forms a duct 82 extending from a first duct opening 84 to a second duct opening 86. As will become apparent from the remainder of the description, the interconnecting duct 56 may have different shapes and sizes depending upon the particular arrangements desired for the vacuum cleaner 50. In this exemplary arrangement, the interconnecting duct 56 has a generally triangular shape with the first duct opening 84 defined on one half of the triangular shape, and the second duct opening 86 defined on the opposite half of the triangular shape. One end of the interconnecting duct 56 is received within the air exhaust opening 72 of the collector housing 66 such that the duct opening 84 is aligned with the air outlet opening 78 of the debris canister 64. At the same time, the other end of the interconnecting duct 56 is received within the intake opening 65 of the motor housing 58 with the duct opening 86 in fluid connection with the air intake 85 of the impeller assembly 62. Thus, when the motor 60 is turned on, the impeller assembly 62 draws air into the inlet 70, through the debris canister 64 and out the air outlet opening 78, through the interconnecting duct 56 and into the air intake of the impeller assembly 62, and from there is exhausted out the air outlet openings 78. As can be seen from FIGS. 1, 2, 4, 5, the interconnecting duct 56 has a shape and form such that the vacuum module 52 can be operatively connected to the collector module 54 in at least two, and possibly more, different assembly arrangements.

One or more screens or filters 87 may be disposed across the air outlet opening 78 of the debris canister 64 and/or one or both of the duct openings 84 and 86 to prevent debris that is sucked into the debris canister 64 from traveling out of the debris canister and into the vacuum module 52, where the debris could enter into the impeller assembly 62. As depicted in FIG. 3, a pleated type filter 79 may be located in the canister 64 and connected to the air outlet 78 to provide an extra level of filtering before the air exits the canister 64. The filter 79 may take the shape of the air outlet 78 and, in one example, may be cylindrical or triangular in shape. In addition, the filter 79 may be a screen or other filter media that covers the air outlet 78 to remove particulate matter that may be drawn through the canister 64. In this way, the air that is pulled into the motor/impeller unit 57 through the interconnecting duct 56 will be substantially free of dirt and debris, which could otherwise damage the impellers or other portions of the motor/impeller unit 57. The filter 79 is preferably removable to allow for easy cleaning. The filter 79 may be removably secured to the air outlet 78 by any method or means known to those of ordinary skill in the art, including, but not limited to, one or more of a clamp, a clamp collar, screws, or any other securing mechanism. However, other arrangements for securing the filter 79 are possible. In addition, the filter 79 may be optionally permanently secured across the clean air exhaust port 352 or the omitted entirely. Additionally or alternatively, a filter bag 89 may be disposed and arranged inside the debris chamber 64 connected to the air intake opening 76 to collect debris that is drawn into the air inlet 70.

Figure 10:
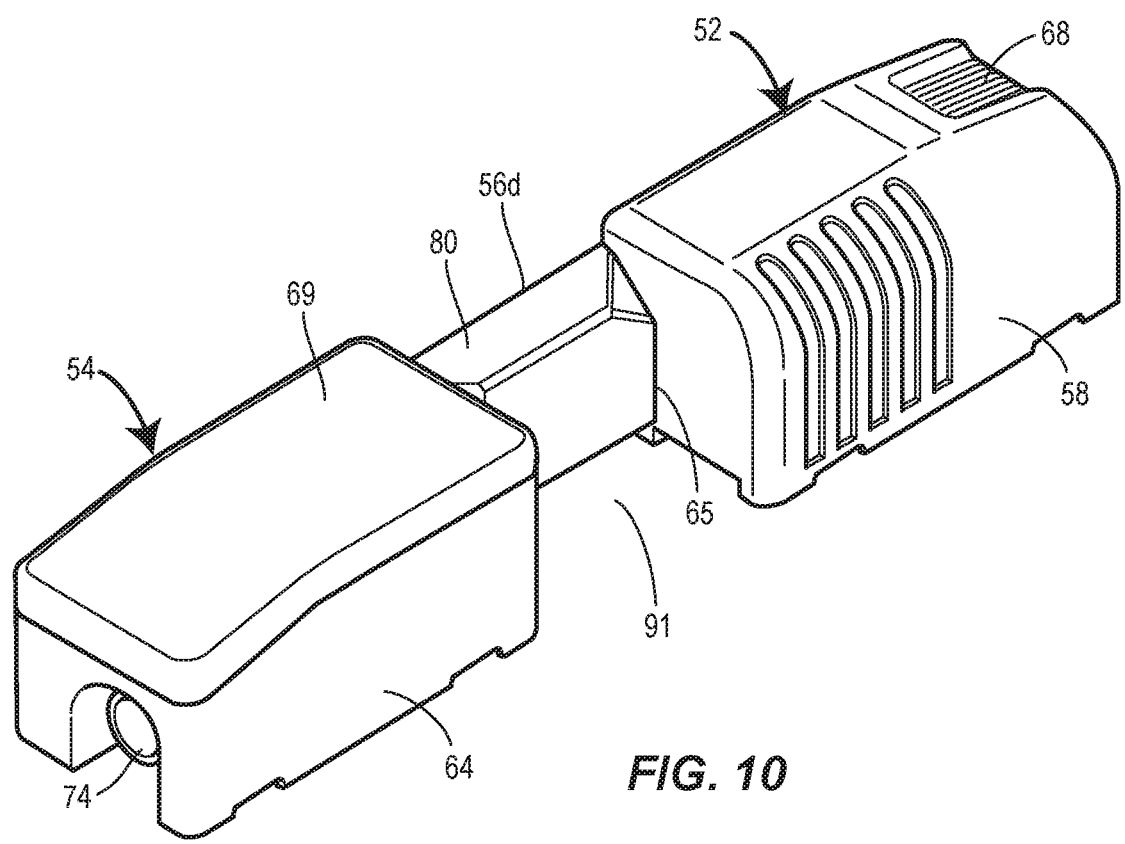
FIG. 10 is an isometric view of a vacuum cleaner similar to FIG. 1, but with a longer interconnecting duct.
Figure 11:
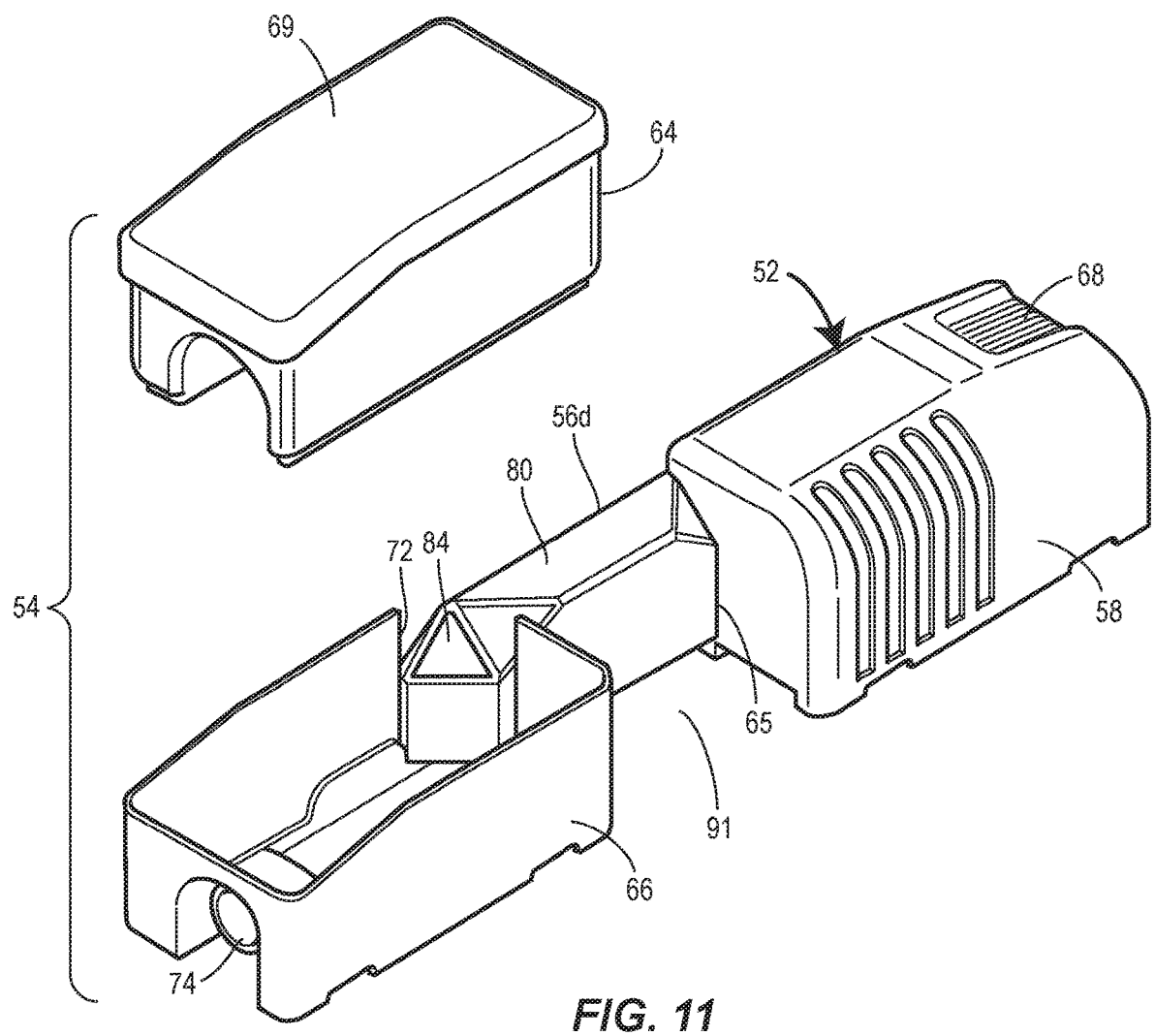
FIG. 11 is a partly exploded isometric view of the vacuum cleaner of FIG. 10.

FIGS. 10 and 11 illustrate the vacuum cleaner 50 with the vacuum module 52 and the collector module 54 and operatively connected together with a longer interconnecting duct 56a. The vacuum module 52 and the collector module 54 are substantially identical as previously described. Further, the interconnecting duct 56a is generally similar to the interconnecting duct 56, except that the body of the duct extending from the duct opening 84 to the duct opening 86 is longer. The remaining portions of the interconnecting duct 56a are substantially the same as the interconnecting duct 56. Thus, whereas the vacuum module 52 and the collector module 54 are disposed immediately adjacent to each other with adjacent sidewalls touching when operatively joined by the interconnecting duct 56, when operatively joined by the interconnecting duct 56a, the vacuum module 52 and the collector module 54 are spaced apart from each other, thus forming a gap 91 between the vacuum module 52 and the collector module 54 as illustrated in FIGS. 10 and 11. Thus, the longer interconnecting duct 56 a allows the option of a collector module 54 to be positioned remotely from the vacuum module 52.

FIG. 11 also more clearly illustrates how the debris canister 64 can be simply and easily removed the collector housing 66, such as by being slid out of top end of the collector housing 66. In this way, debris collected within the debris canister 64 can be simply and easily removed by pulling the debris canister 64 up out of the collector housing 66, opening the lid 69, and dumping the debris out of the interior and/or removing a filter bag 89 if used. This allows debris to be easily removed from the collector module 54 without having to remove the entire vacuum assembly 50 or even the entire collector module 54 from the vehicle. Further, the hose connection remains undisturbed when the debris canister 64 is removed from the collector housing 66. It also allows removal of the canister 64 while it is still covered, minimizing the chances that its removal will result in its contents being spilled.

Figure 12:
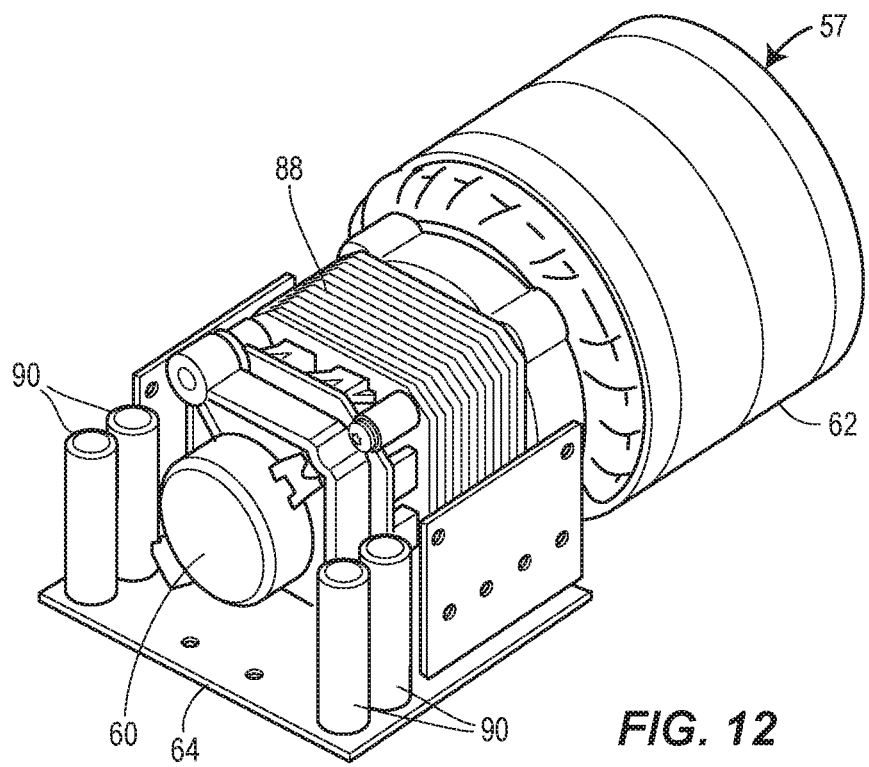
FIG. 12 is an isometric view of the motor/induction unit of the vacuum module of FIG. 1.
Figure 13:
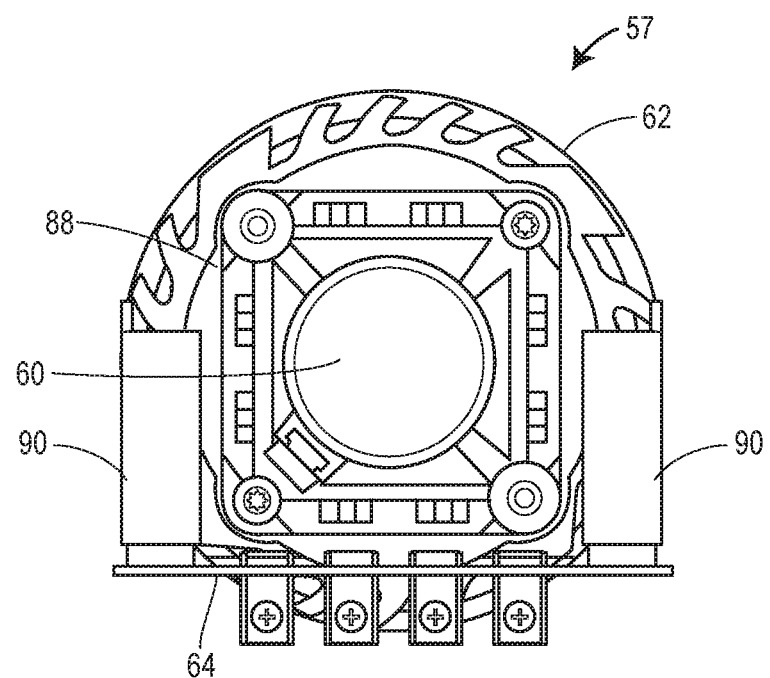
FIG. 13 is an end view of the motor/induction unit of FIG. 12.
Figure 14:
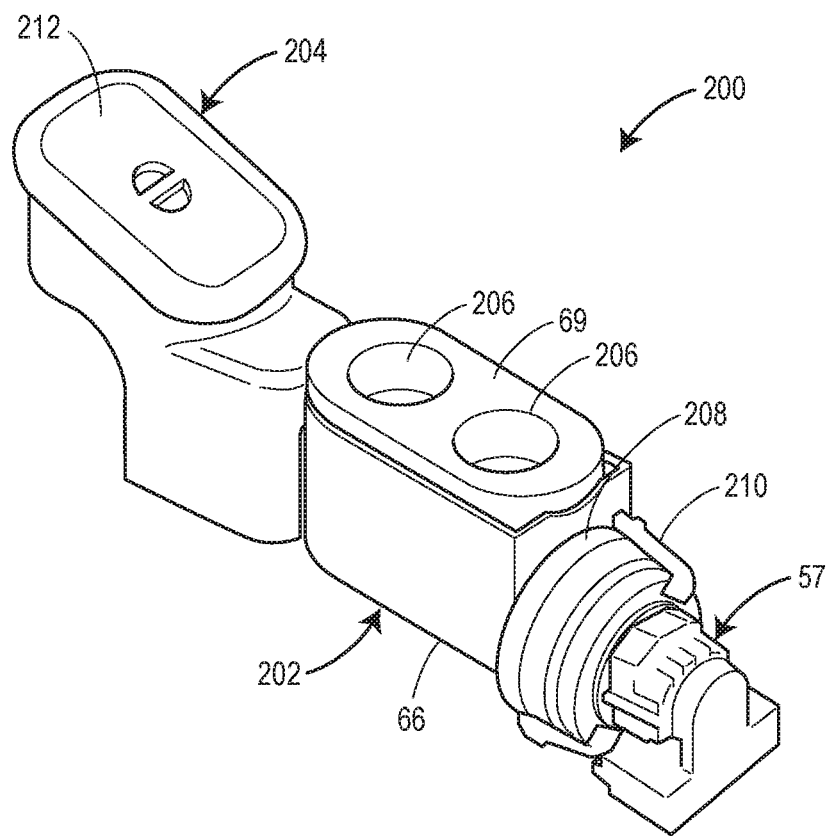
FIG. 14 is an isometric view of still another vacuum cleaner to be mounted inside a vehicle according to the present disclosure.
Figure 15:
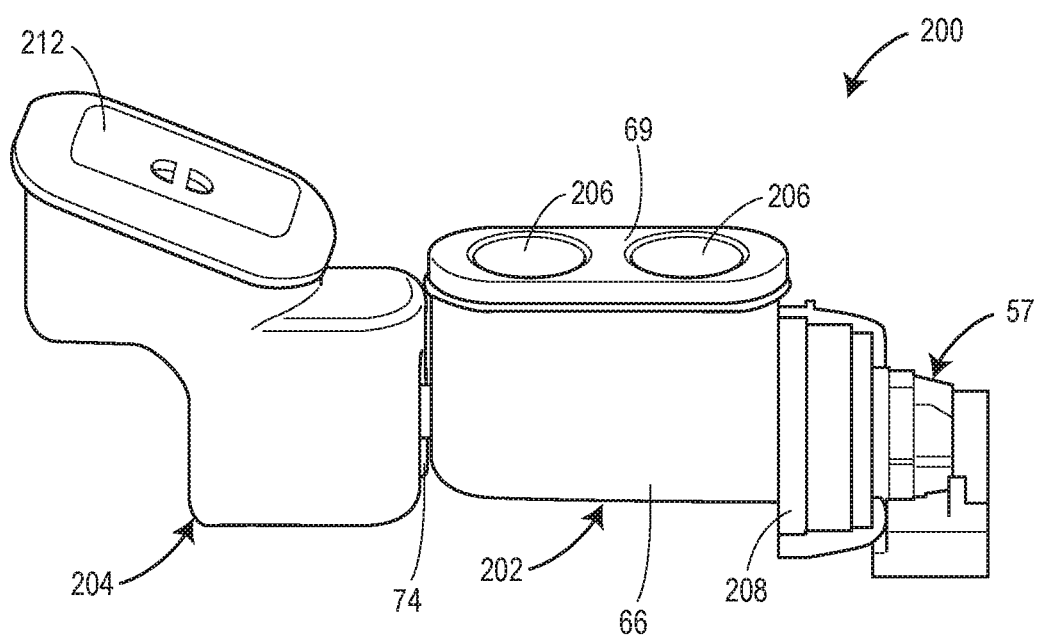
FIG. 15 is a side view of the vacuum cleaner of FIG. 14.
Figure 16:
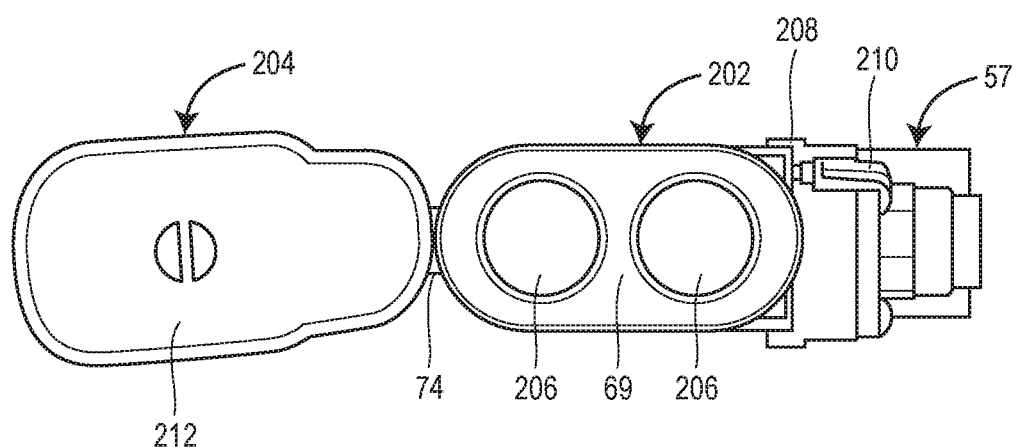
FIG. 16 is a top plan view of the vacuum cleaner of FIG. 14.

FIGS. 12 and 13 show the motor/impeller unit 57, including the motor 60, the impeller assembly 62, and the controller 64, in isolation from the remaining portions of the vacuum module 52. In this arrangement, the motor 60 is disposed in-line along the axis of the impeller assembly 62. The PCB of the controller 64 is disposed adjacent the motor 60 and axially aligned with the impeller assembly 62, and a heat sink 88 in the form of a plurality of parallel heat fins and power electronics 90 are disposed at opposing perpendicularity to the PCB of the controller 64. The controller 64 and the power electronics 90 are arranged like a saddle disposed over the motor 60 and axially aligned with the impeller assembly 62. This arrangement creates a smaller form factor or package outline to fit within the motor housing 58. In this way, the vacuum module 52 can take up less space within the passenger or other compartment of a vehicle.

In operation, when the motor 60 is turned on to drive the impeller assembly 62, air and debris are drawn in and enter through the hose connector 74 in the air inlet 70, for example through the vacuum hose. The debris is collected inside the debris canister 64, for example in the filter bag 89. Clean-air exits the debris canister 64 through the air outlet opening 78 and passes through the interconnecting duct 56 or 56a. From the interconnecting duct, the air is drawn into the air intake of the impeller assembly 62, through the impeller assembly 62, and exhausted out of the vacuum module through the air outlet openings 68. The exhausted air is also drawn across the PCB of the controller 64 and the motor 68, as well as the heat sink 88 before being exhausted through the air outlet openings 68 so as to cool the motor/impeller unit 57.

FIGS. 14-17 illustrate yet another form factor and assembly arrangement of a vacuum cleaner 200 in accordance with aspects of the present disclosure. Unlike the previous vacuum cleaners, the vacuum cleaner 200 has the motor/impeller unit 57 fixedly coupled directly to a collector module 202 in an in-line configuration. In addition, a hose storage module 204 is optionally attached to the collector module 202 on the opposite end from the motor/impeller unit 57. The hose storage module 204 includes a storage compartment that defines an interior space designed to receive and store a vacuum hose 214. The hose storage module 204 is coupled to the hose connector 74 of the collector module 202. The vacuum cleaner 200 may be particularly well-suited and configured to be installed in the cargo compartment and/or along a side wall of the passenger compartment of a sport-utility vehicle adjacent one of the rear or third row passenger seats.

Figure 17:
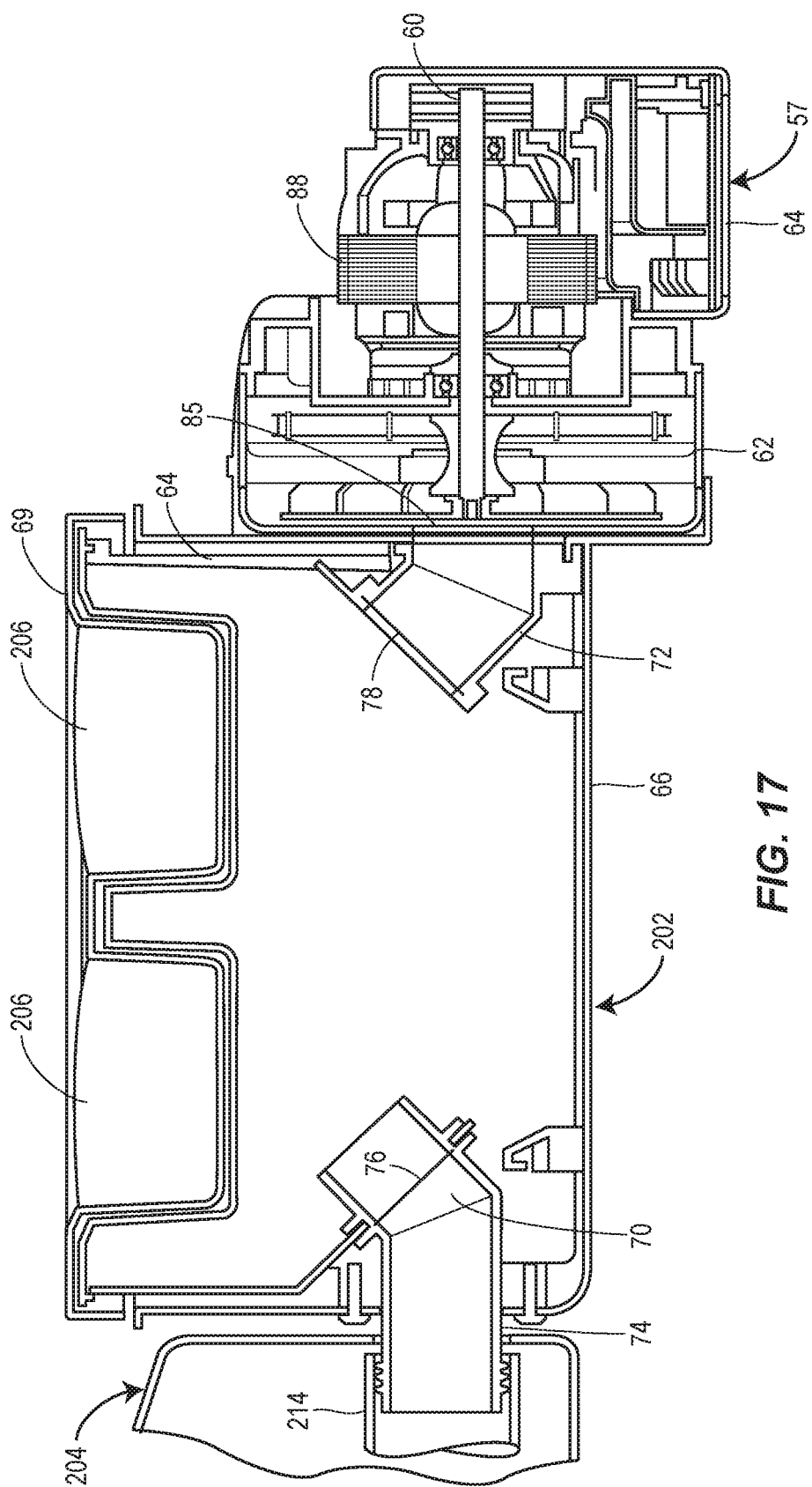
FIG. 17 is a longitudinal cross-sectional view of the vacuum cleaner FIG. 14.

FIG. 17 more clearly shows an arrangement of the motor/impeller unit 57 and the collector module 202. Similar to the collector modules 54 and 154, the collector module 202 also includes a debris canister 64 that is removably received within a collector housing 66. However, the specific configurations of the debris canister 64 and the collector housing 66, as well as air inlets and air outlets therefrom are different, as described hereinafter. Also different from the previous vacuum cleaners 50 and 150, the motor/impeller unit 57 is attached directly to the collector housing 66 such that the air intake 85 of the impeller assembly 62 is coupled directly to the air exhaust opening of the collector housing 66. An additional cover and/or housing for the motor/impeller unit 57 may be provided as a part of either the vacuum cleaner 200 itself or as part of the vehicle, such as a console body in the passenger compartment of the vehicle, in which the vacuum cleaner 200 is installed.

In this arrangement, the collector housing 66 includes an air inlet 70 at one end of the housing 66 and an air exhaust opening 72 at the opposite end of the housing. The air inlet 70 is formed by a tube that also forms the hose connector 74 extending outwardly from the housing 66. The hose connector 74 is configured to have a vacuum hose 214 mounted thereon, such as the vacuum hose that is coiled and stored inside the hose storage module 204. The air exhaust opening 72 is also formed by a short tube that extends to the surface of the opposite end of the collector housing 66. Both tubes that form the air inlet 70 and the air exhaust opening 72 are angled upwardly on the inner side of the collector housing 66. The debris canister 64 includes inwardly tapered and downwardly facing shoulders that rest on the upwardly turned ends of the tubes of the air inlet 70 and the air exhaust opening 72. The air intake opening 76 extends through one shoulder of the debris canister and the air exhaust opening 72 extends through the opposite shoulder of the debris canister 64. The debris canister 64 is configured such that the air intake opening 76 aligns with and against the upwardly turned end of the tube of the air inlet 70 and the air outlet opening 78 aligns with and against the upwardly turned end of the tube of the air exhaust opening 72 when operatively disposed inside the collector housing 66. Thus, the debris canister 64 may be easily removed from the collector housing 66 by simply pulling the debris canister 64 upwardly out of the top of the collector housing 66 and similarly easily reinstalled by sliding the debris caster 64 downwardly into the collector housing 66.

Also in this arrangement, the lid 69 of the debris caster 64 includes two recessed cup holders 206. In many cases the back of an SUV or similar vehicle with a third row of seats has a location in the side panel for cup holders, so this arrangement fits easily into the existing design of many vehicles. However, the cup holders 206 are optional and need not be included. Also, other features may be included in the lid 69 if desired.

The collector housing 66 includes a mounting bracket 208 configured to mount the motor/impeller unit 57 directly to the collector housing 66 with the air intake 85 of the impeller 62 aligned with the outlet of the tube forming the air exhaust opening 72. The mounting bracket 208 in this arrangement is in the form of a circular collar, which receives the end of the impeller 62 therein. However, the mounting bracket 208 may take other shapes and forms. The motor/impeller unit 57 is secured to the mounting bracket 208 in any convenient manner, such as with screws, clips, and/or other types of fasteners. In this arrangement, the motor/impeller unit 57 is secured to the mounting bracket 208 with a combination of screws and clips 210 that fixedly hold and mount the impeller 62 against the end wall of the collector housing 66 and centered by the circular collar 208 so that the air intake 85 of the impeller 62 is aligned with and against the air exhaust opening 72.

The hose storage module 204 includes a storage compartment that defines an interior space into which a flexible vacuum hose 214 can be coiled and stored. The hose storage module 204 optionally includes a lid 212, which can be open to allow access to the interior space of the storage compartment and the vacuum hose stored therein, and which can be closed to cover the interior space of the storage compartment and the vacuum hoses stored therein. As best seen in FIG. 25, the hose storage module 204 is attached to the collector module 202 by being mounted to the end of the hose connector 74 that protrudes out of the back end of the collector housing 66.

Due to the modularity of the individual components of the vacuum cleaner 200, the vacuum cleaner may be assembled in many different arrangements. For example, in the exemplary assembly arrangement of the drawings, the motor/impeller unit 57, the collector module 202, and the hose storage module 204 are assembled in an in-line arrangement, with the motor/impeller unit 57 and the storage module 204 disposed on and axially aligned with opposite axial ends of the collector module 202, which may be particularly well-suited for installation along the side of a passenger compartment of a sport-utility vehicle or other larger vehicle. However, due to the modularity of the modules 57, 202, and 204, in other arrangements the vacuum cleaner 200 with the storage module 204 and the collector module 202 may be in a side-by-side arrangement or any angled arrangement with only a slight modification to the shape of the hose connector 74. Similarly, the angular arrangement between the motor/impeller unit 57 and the collector module 202 may be modified from the in-line position shown in the figures to an angled arrangement, with only minor modifications to the location and shape of the air exhaust opening 72.

Upon being operatively installed within a vehicle, the vacuum cleaner 200 operates substantially identically as previously described relative to the vacuum cleaner 50.

Figure 18:
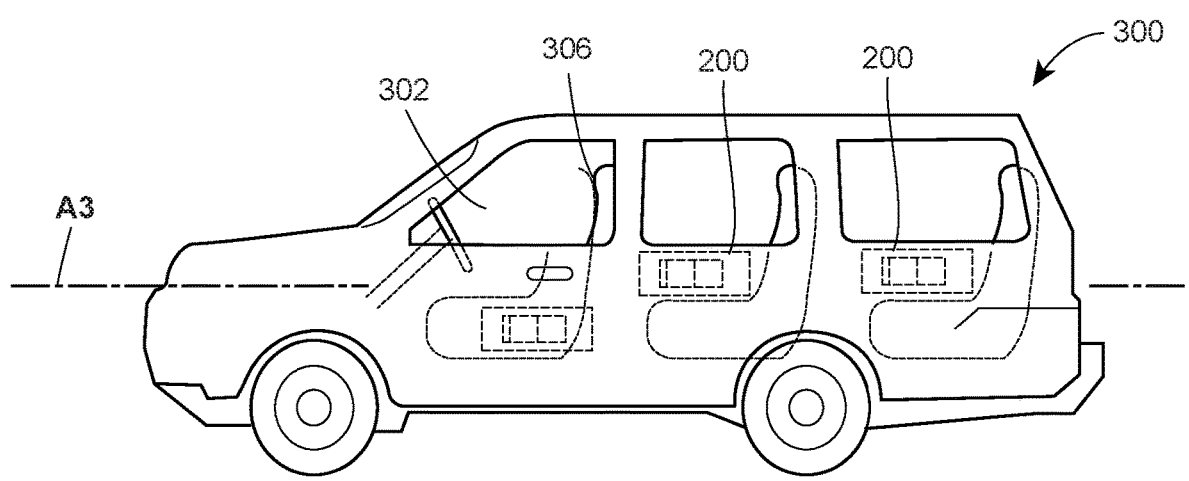
FIG. 18 is an exemplary illustration of the vacuum cleaner of FIG. 14 operatively installed in a vehicle.

Referring now to FIG. 18, the vacuum cleaner 200 is depicted operatively installed in the passenger compartment 302 of an exemplary automobile 300. The vacuum cleaner 200 is secured to one or more fixtures inside the passenger compartment 302 with appropriate fasteners to prevent it from moving around inside the passenger compartment 302. The motor/impeller unit 57 is electrically connected to the electrical system of the automobile 300 so as to provide sufficient power to the motor 62 run the vacuum cleaner 200 for cleaning the interior of the passenger compartment 302. In the example of FIG. 18, the automobile 300 is illustrated as a sport-utility vehicle. However, the automobile 300 could take other forms, such as a car, a truck, a tractor, or any other type of vehicle with a passenger compartment 302 and an electrical system sufficient to power the vacuum cleaner 300, such as an aircraft or boat.

As depicted in FIG. 18, the vacuum cleaner 200 may be secured along a side wall of the passenger compartment 302. In other arrangements, the vacuum cleaner 200 may be secured between two other seats in the passenger compartment 302, such as between two passenger seats in an intermediate row of seats of the automobile 300. In yet another arrangement, and as also depicted in FIG. 18, the vacuum cleaner 200 may alternatively be secured to the cargo compartment.

The vacuum cleaner 200 may be secured in any manner sufficient to prevent the vacuum cleaner from moving around inside the console, such as by brackets and/or fasteners. In any event, the vacuum cleaner 200 is operatively installed and secured with the lid 69 of the debris canister 64 facing upwardly. In this way, the debris canister 64 can be removed from the collector housing 66 by pulling the debris canister 64 out of collector housing (as described previously). Similarly, the debris canister 64 can be easily returned to its operative position in the vacuum cleaner 200 by inserting the debris canister 64 down into the interior space of the collector housing 66. This allows the debris canister 64 to be easily removed from the automobile 300 for removing accumulated debris, cleaning, or other purposes, and reinstalled into its operative position, without having to disconnect and/or disassemble a vacuum hose or other portion of the vacuum cleaner from the installed operative position.

The particular shapes and sizes of the collector modules, the vacuum modules, and the interconnecting ducts, may be modified to conform to many different space configurations as may be dictated by the shapes and sizes of the components within the vehicle and/or decorative design considerations. Typically, it is anticipated that the vacuum cleaners will be configured for installation within the passenger and/or cargo compartment of a vehicle. However, the vacuum cleaners could be configured for installation in other areas of a vehicle as well.

A vacuum cleaner according to some aspects of the present disclosure provides an assembly that may be easily configured to conform to different spaces within a vehicle. The nature of the vacuum cleaners according to some aspects of the present disclosure allows a single vacuum cleaner to be assembled in different arrangements for different vehicle configurations. Additional and/or alternative functional benefits of vacuum cleaners according to various aspects of the present disclosure will be apparent to the person of ordinary skill.

The technical examples described and shown in detail herein are only exemplary of one or more aspects of the teachings of the present disclosure. Additional aspects, arrangements, and forms within the scope of the appended claims and all technically operative combinations of features disclosed herein are contemplated, the rights to which are expressly reserved.

What is claimed is:

1. A vacuum cleaner comprising:
   a collector module configured to collect debris, wherein the collector module includes an air inlet and an air exhaust opening;
   a motor/impeller unit connected to the collector module at the air exhaust opening, wherein the motor/impeller unit is configured to draw air through the collector module from the air inlet to the air exhaust opening;
   a hose storage module connected to the air inlet and the collector module on an end opposite from the motor/impeller unit; and
   a vacuum hose stored inside the hose storage module.

2. The vacuum cleaner of claim 1, wherein the collector module, the motor/impeller unit, and the hose storage module are arranged in an in-line configuration.

3. The vacuum cleaner of claim 1, wherein the hose storage module further comprises:
   a lid configured to be opened to allow access to the vacuum hose stored inside the hose storage module, and configured to be closed to cover the vacuum hose stored inside hose storage module.

4. The vacuum cleaner of claim 1, wherein the collector module further comprises:
   a mounting bracket, wherein the motor/impeller unit is attached to the collector module with the mounting bracket.

5. The vacuum cleaner of claim 1, wherein the air inlet comprises a tube that forms a hose connector outwardly extending from the collector module.

6. The vacuum cleaner of claim 5, wherein the tube that comprises the air inlet is angled on an inner side of the collector module.

7. The vacuum cleaner of claim 1, wherein the air exhaust opening comprises a tube extending to a surface of an end of the collector module opposite the air inlet.

* * * * *